(12) United States Patent
Woolf

(10) Patent No.: US 11,498,393 B2
(45) Date of Patent: Nov. 15, 2022

(54) REFRIGERATION CYCLE INTERCOOLER WITH DUAL COIL EVAPORATOR

(71) Applicant: Dustin A. Woolf, Elk Grove, CA (US)

(72) Inventor: Dustin A. Woolf, Elk Grove, CA (US)

(*) Notice: Subject to any disclaimer, the term of this patent is extended or adjusted under 35 U.S.C. 154(b) by 71 days.

(21) Appl. No.: 17/194,552

(22) Filed: Mar. 8, 2021

(65) Prior Publication Data
US 2022/0281291 A1    Sep. 8, 2022

(51) Int. Cl.
*B60H 1/32* (2006.01)
*B60H 1/00* (2006.01)

(52) U.S. Cl.
CPC ....... *B60H 1/3227* (2013.01); *B60H 1/00485* (2013.01); *B60H 1/3205* (2013.01); *B60H 2001/3264* (2013.01)

(58) Field of Classification Search
CPC .............. B60H 1/3227; B60H 1/00485; B60H 1/3205; B60H 2001/3264
See application file for complete search history.

(56) References Cited

U.S. PATENT DOCUMENTS

| | | | |
|---|---|---|---|
| 2008/0149317 A1* | 6/2008 | Baker | F28D 7/022 165/163 |
| 2010/0096115 A1* | 4/2010 | Erickson | F28F 9/0132 165/163 |
| 2018/0230874 A1* | 8/2018 | Ghoniem | F01N 3/021 |
| 2019/0178109 A1* | 6/2019 | Cocuzza | F01K 7/16 |

* cited by examiner

*Primary Examiner* — Marc E Norman
(74) *Attorney, Agent, or Firm* — Craig A. Simmermon

(57) ABSTRACT

Refrigeration cycle intercooler with dual coil evaporator is a component in a refrigeration cycle that is installed in a vehicle with an internal combustion engine or motor. The refrigeration cycle operates by continuously cycling a refrigerant through a closed loop where refrigerant passes through an inner coil evaporator and an outer coil evaporator where the refrigerant changes from liquid to gas, thereby providing a cooling effect. During operation, fresh air or outside air continuously passes by the inner coil evaporator and the outer coil evaporator and then continues into the internal combustion engine or motor air intake. The inner coil evaporator and the outer coil evaporator function to cool and dry the intake air for the internal combustion engine or motor. The inner coil evaporator and an outer coil evaporator are specially designed to provide substantially more cooling and drying than any other intercooler design.

5 Claims, 19 Drawing Sheets

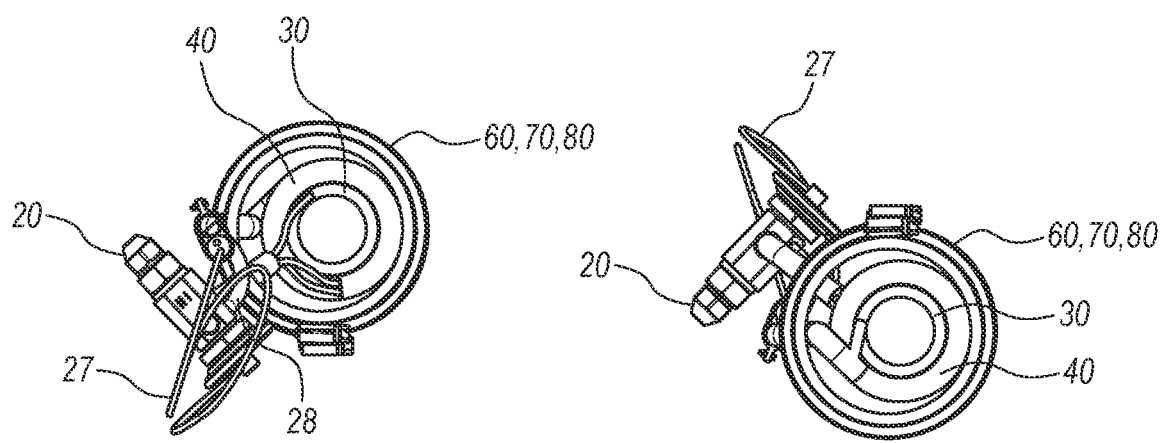
*FIG. 12*    *FIG. 13*

REFRIGERATION CYCLE INTERCOOLER WITH DUAL COIL EVAPORATOR

BACKGROUND OF THE INVENTION

1. Field of the Invention

This invention relates to an intercooler for an internal combustion engine or motor where an intercooler cools the combustion air flowing into the internal combustion engine or motor and specifically to such a device that cools the intake fresh air with a dual coil evaporator that is cooled from a refrigerant in a special refrigeration cycle.

2. Description of Related Art

Intercoolers for an internal combustion engine or motor are common in the prior art. However, there are no intercoolers that are cooled by a special dual coil evaporator that is part of a special vehicle-mounted refrigeration cycle as shown and described here. Certainly, there are no intercoolers in the prior art that are cooled by a special reverse-wind dual coil evaporator that is part of a special vehicle-mounted refrigeration cycle as shown and described here. The special reverse-wind dual coil evaporator of this invention greatly improves cooling of the fresh air intake for the engine or motor. The special reverse-wind dual coil evaporator is also streamlined and aerodynamic in shape to greatly reduce air friction or drag on the fresh air intake for the engine or motor to allow for very efficient cool air intake for the engine or motor.

BRIEF SUMMARY OF THE INVENTION

It is an aspect of refrigeration cycle intercooler with dual coil evaporator to function as an intercooler for an internal combustion engine or motor in a vehicle.

It is an aspect of refrigeration cycle intercooler with dual coil evaporator to cool and dry the intake air for an internal combustion engine or motor in a vehicle.

It is an aspect of refrigeration cycle intercooler with dual coil evaporator to cycle refrigerant through a refrigeration cycle to act as a cooling mechanism to cool and dry the intake air for an internal combustion engine or motor in a vehicle.

It is an aspect of refrigeration cycle intercooler with dual coil evaporator to be a component of a refrigeration cycle that is completely contained in a vehicle.

It is an aspect of refrigeration cycle intercooler with dual coil evaporator to function as an evaporator in the refrigeration cycle.

It is an aspect of refrigeration cycle intercooler with dual coil evaporator to include an inner coil and an outer coil that are helically wound in opposite directions in best mode.

It is an aspect of refrigeration cycle intercooler with dual coil evaporator to include a housing that directs and channels intake air for an internal combustion engine or motor across the inner coil and an outer helically wound coils to drastically and quickly cool and dry the intake air.

It is an aspect of refrigeration cycle intercooler with dual coil evaporator to provide exponentially more cooling and drying of the intake air for an internal combustion engine or motor than any other intercooler design for an internal combustion engine or motor.

BRIEF DESCRIPTION OF THE DRAWINGS

FIG. 12 is a top plan view of a second embodiment of refrigeration cycle intercooler with dual coil evaporator.

FIG. 13 is a bottom pan view of a second embodiment of refrigeration cycle intercooler with dual coil evaporator.

DEFINITION LIST

Figure 1:
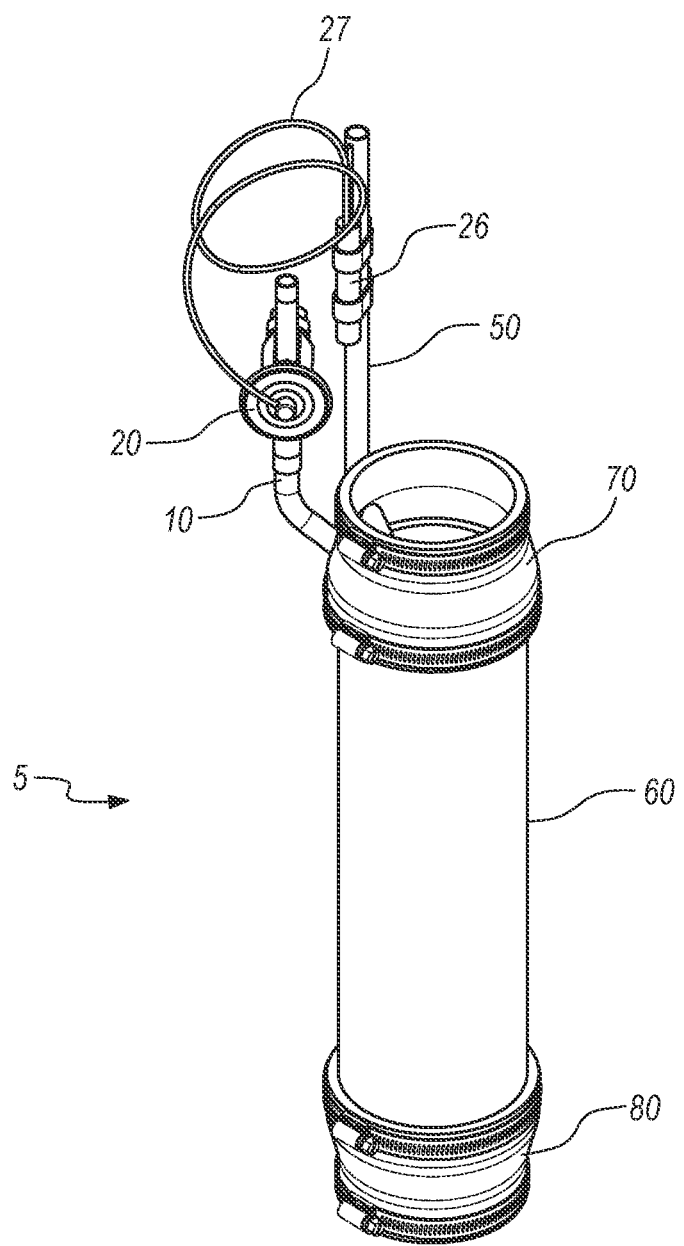
FIG. 1 is a perspective view of a first embodiment of refrigeration cycle intercooler with dual coil evaporator.
Figure 2:
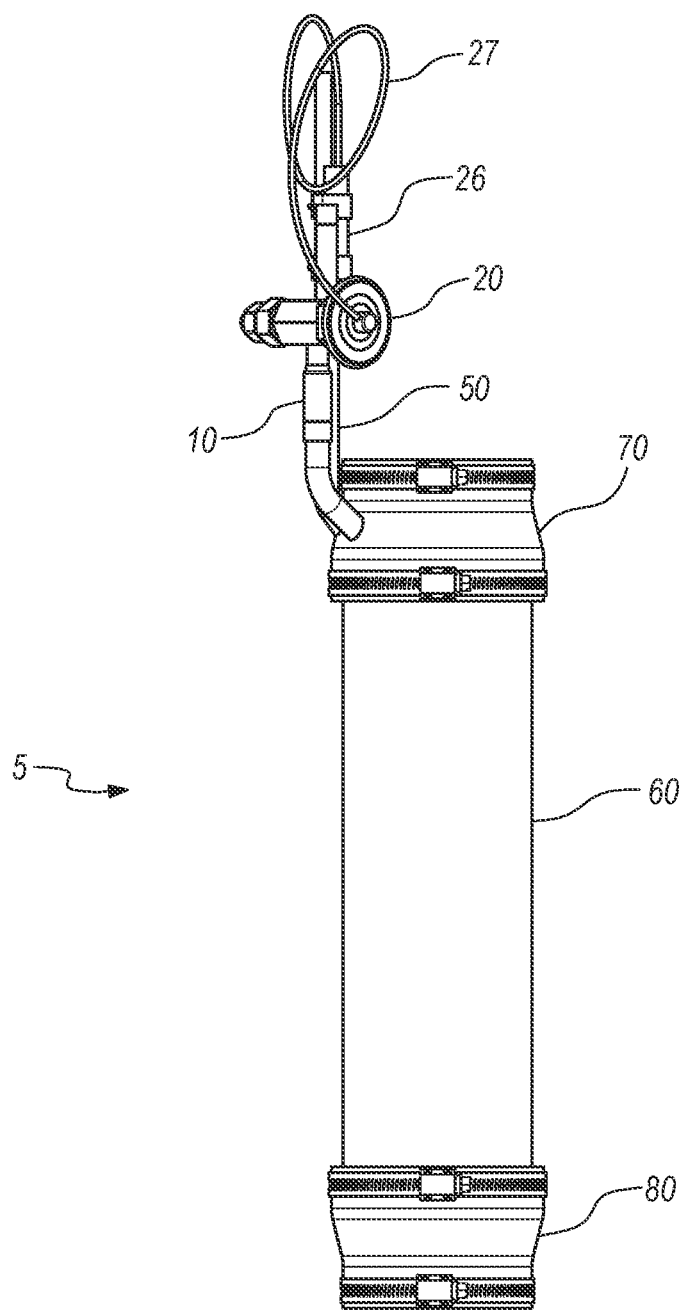
FIG. 2 is a front elevation view of a first embodiment of refrigeration cycle intercooler with dual coil evaporator.
Figure 3:
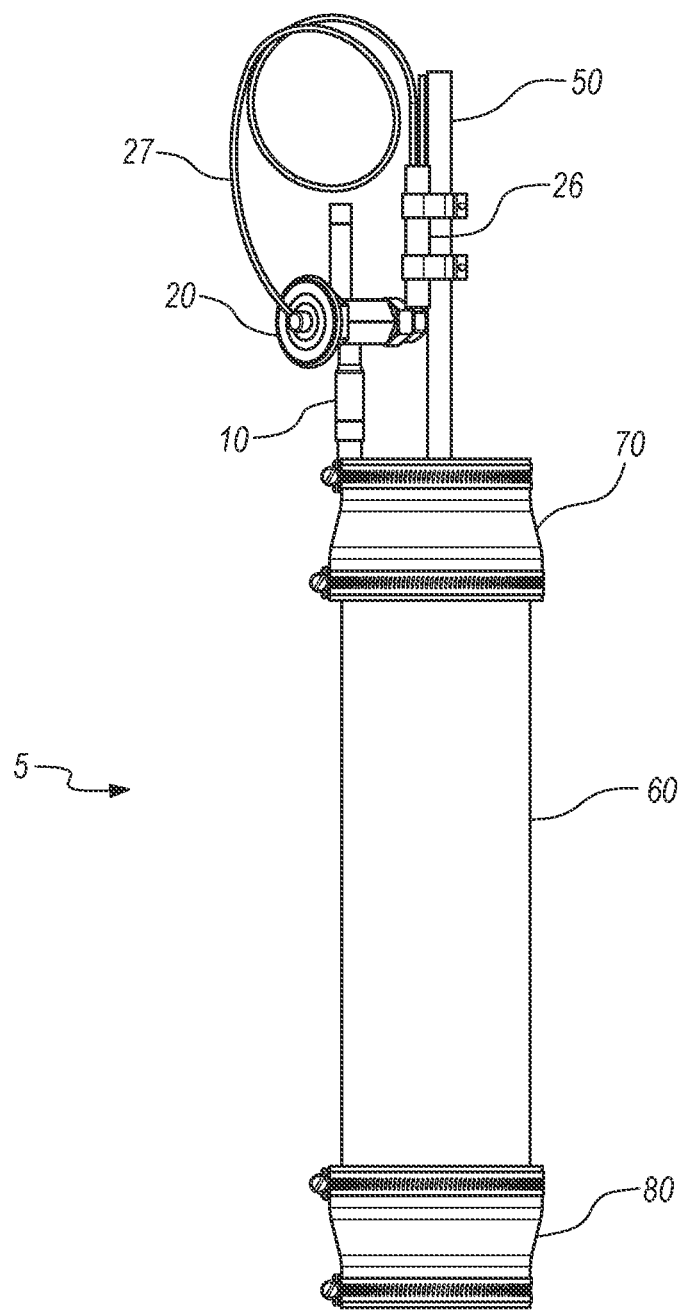
FIG. 3 is a side elevation view of a first embodiment of refrigeration cycle intercooler with dual coil evaporator.
Figures 4, 5:
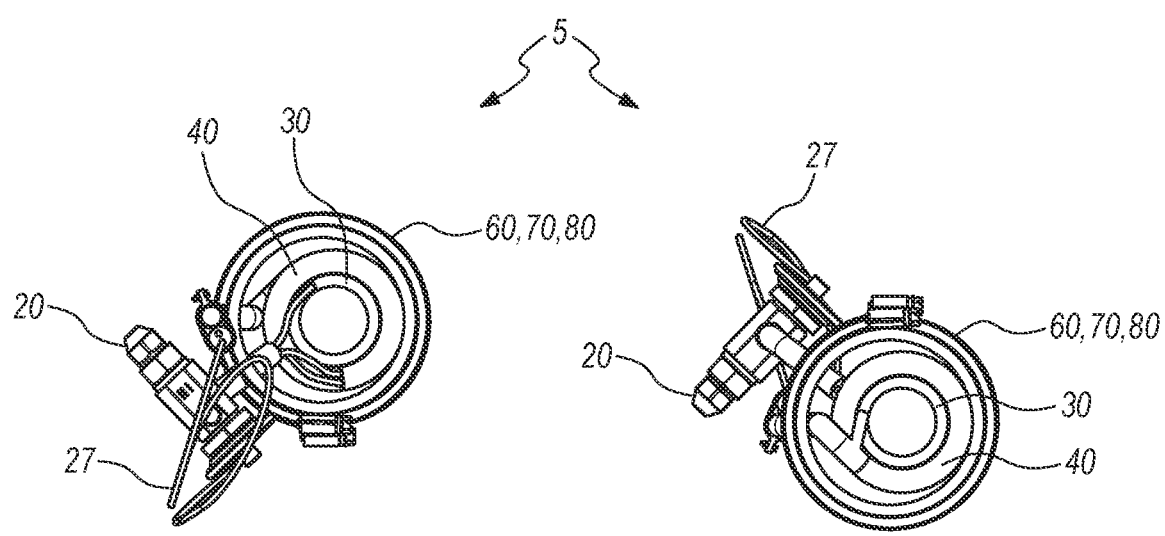
FIG. 4 is a top plan view of a first embodiment of refrigeration cycle intercooler with dual coil evaporator.
FIG. 5 is a bottom pan view of a first embodiment of refrigeration cycle intercooler with dual coil evaporator.
Figure 6:
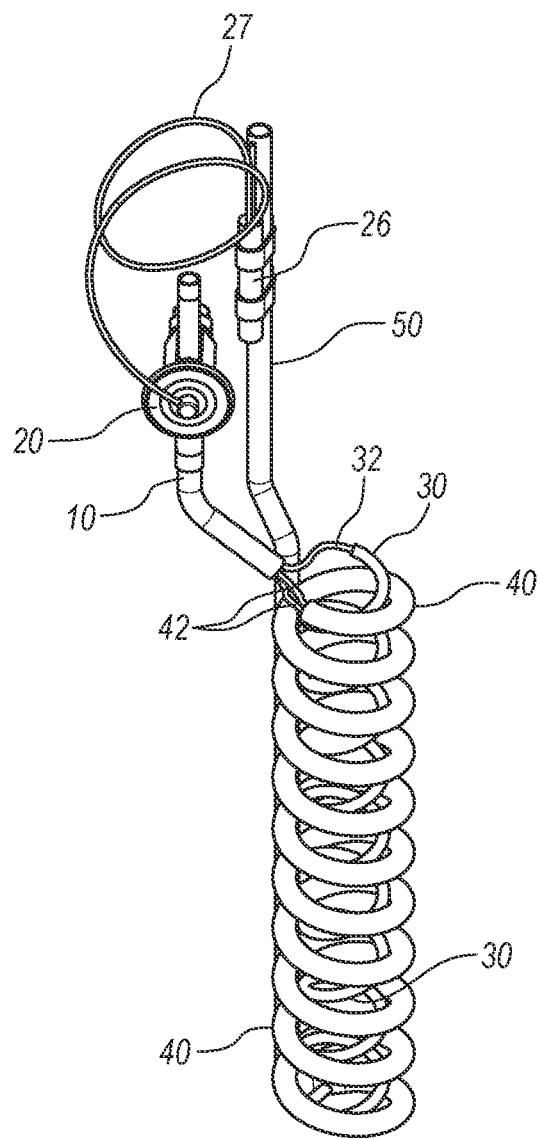
FIG. 6 is perspective view of inner and outer coil evaporators connected to main refrigerant feed line, main refrigerant return line, and a first embodiment of thermal expansion valve.
Figure 7:
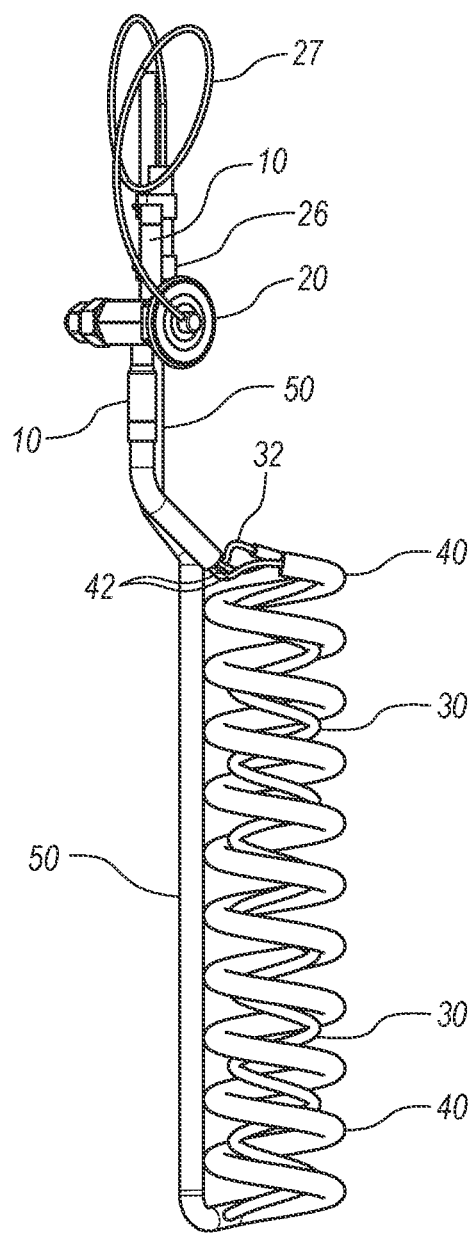
FIG. 7 is front elevation view of inner and outer coil evaporators connected to main refrigerant feed line, main refrigerant return line, and a first embodiment of thermal expansion valve.
Figure 8:
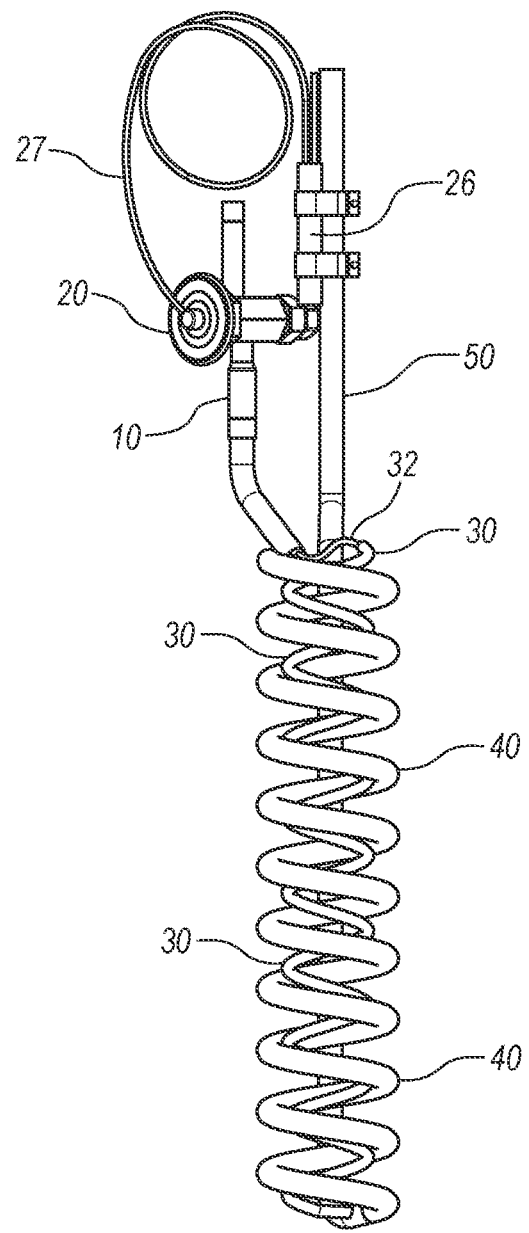
FIG. 8 is side elevation view of inner and outer coil evaporators connected to main refrigerant feed line, main refrigerant return line, and a first embodiment of thermal expansion valve.
Figure 9:
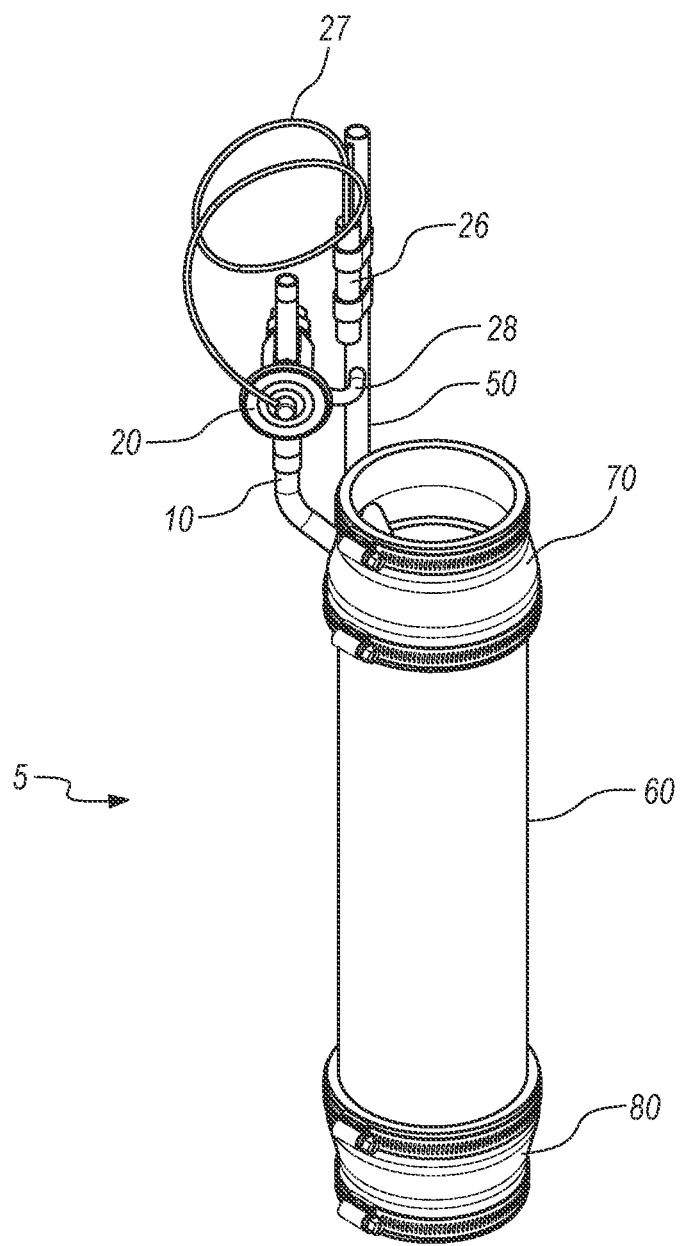
FIG. 9 is a perspective view of a second embodiment of refrigeration cycle intercooler with dual coil evaporator.
Figure 10:
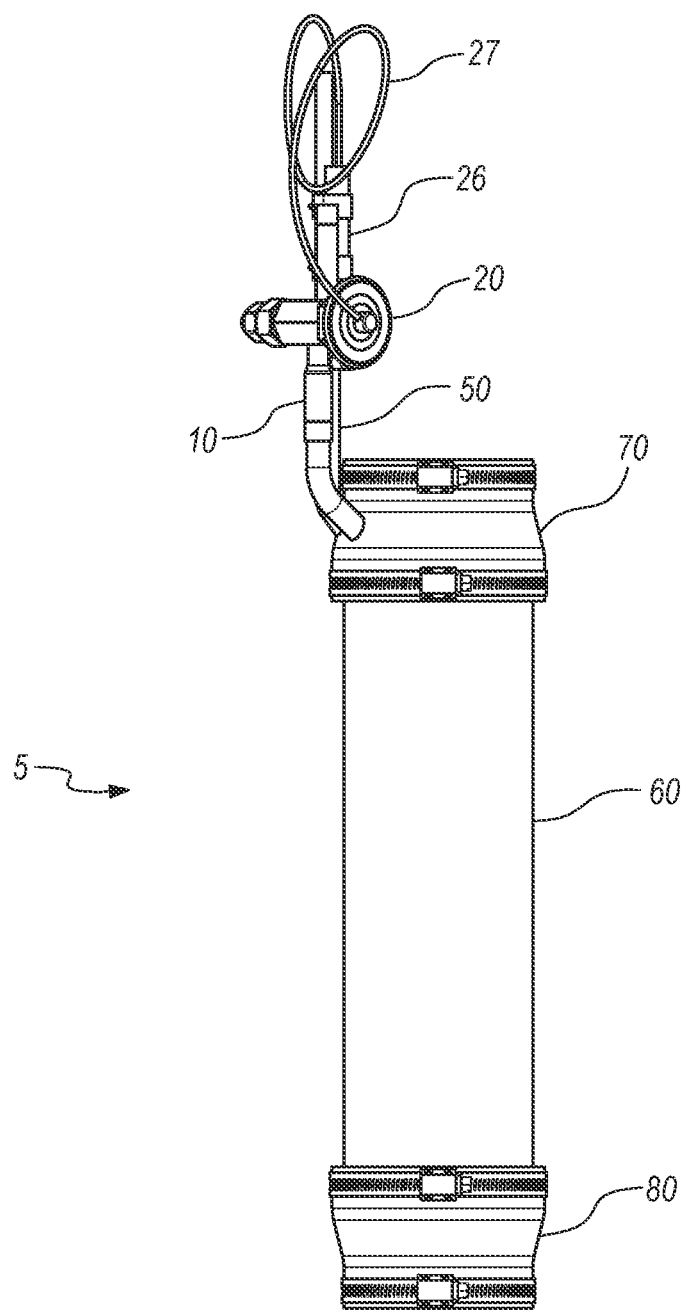
FIG. 10 is a front elevation view of a second embodiment of refrigeration cycle intercooler with dual coil evaporator.
Figure 11:
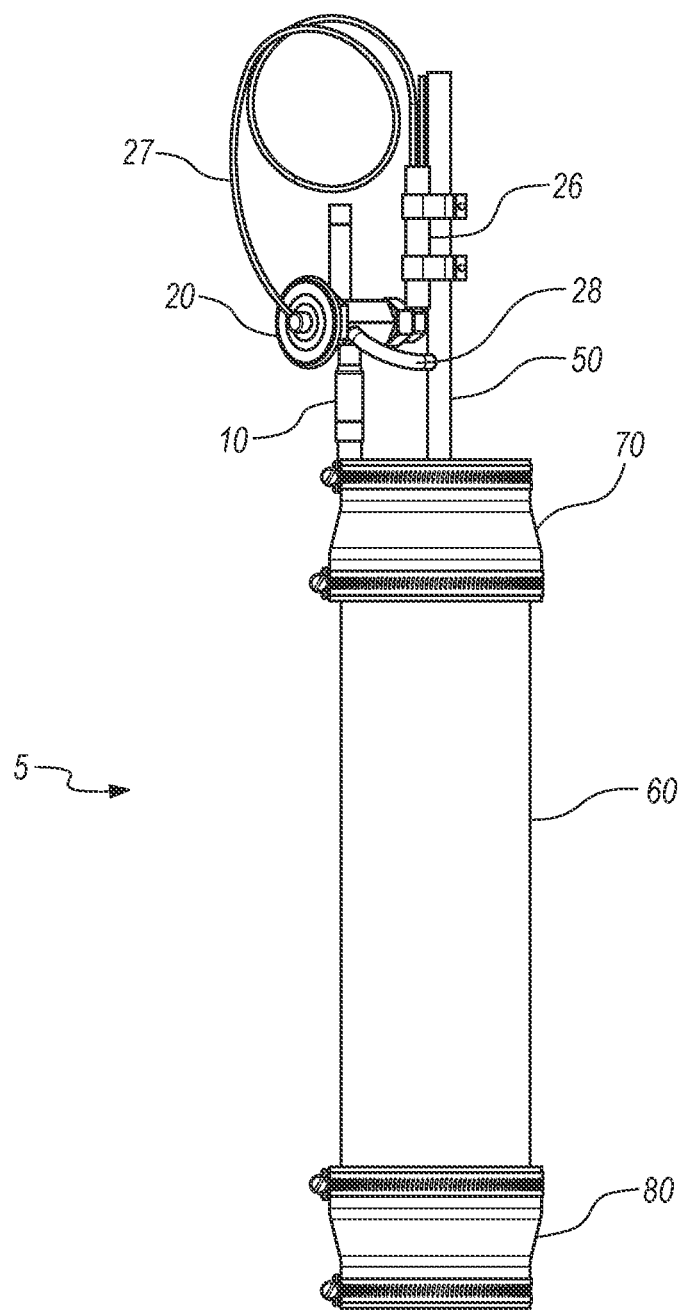
FIG. 11 is a side elevation view of a second embodiment of refrigeration cycle intercooler with dual coil evaporator.
Figure 14:
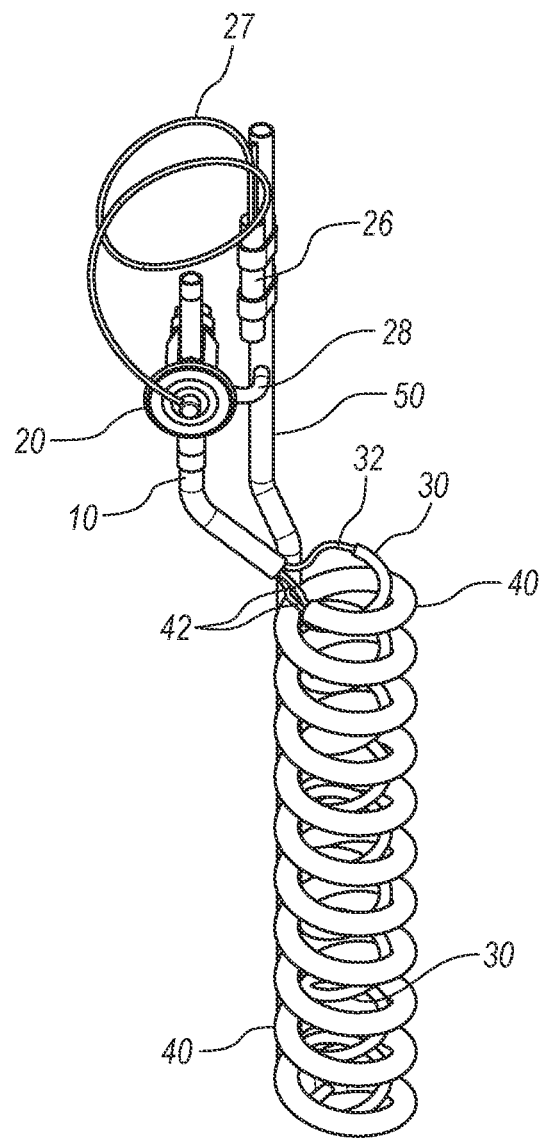
FIG. 14 is perspective view of inner and outer coil evaporators connected to main refrigerant feed line, main refrigerant return line, and a second embodiment of thermal expansion valve.
Figure 15:
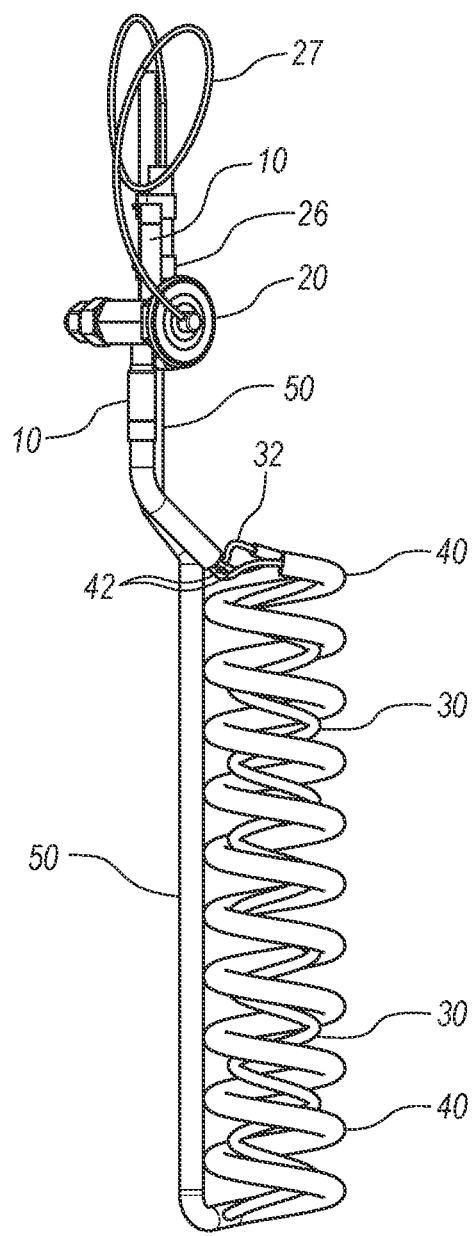
FIG. 15 is front elevation view of inner and outer coil evaporators connected to main refrigerant feed line, main refrigerant return line, and a second embodiment of thermal expansion valve.
Figure 16:
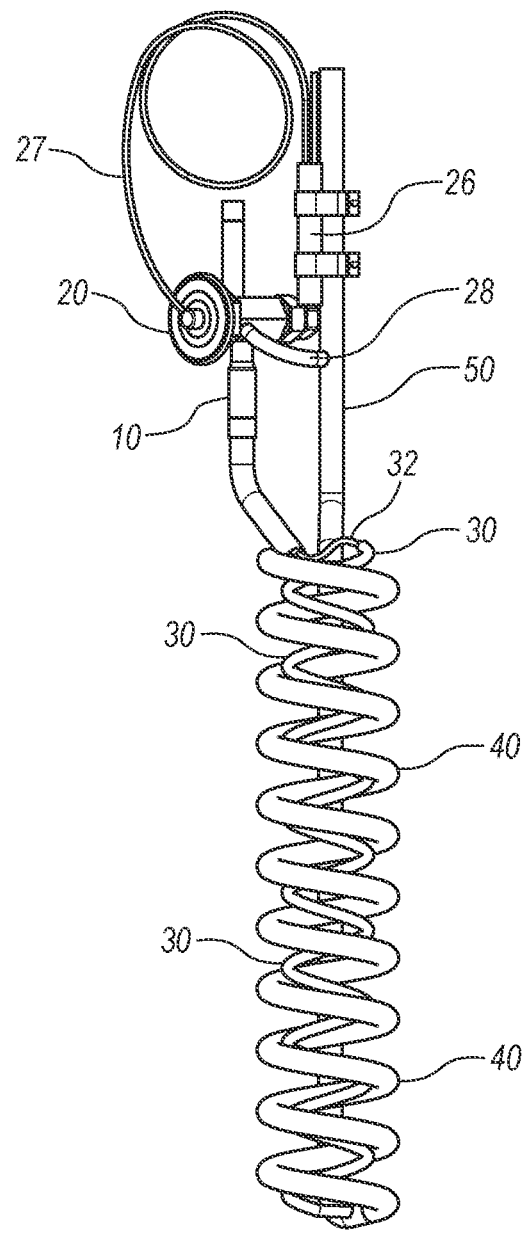
FIG. 16 is side elevation view of inner and outer coil evaporators connected to main refrigerant feed line, main refrigerant return line, and a second embodiment of thermal expansion valve.
Figure 17:
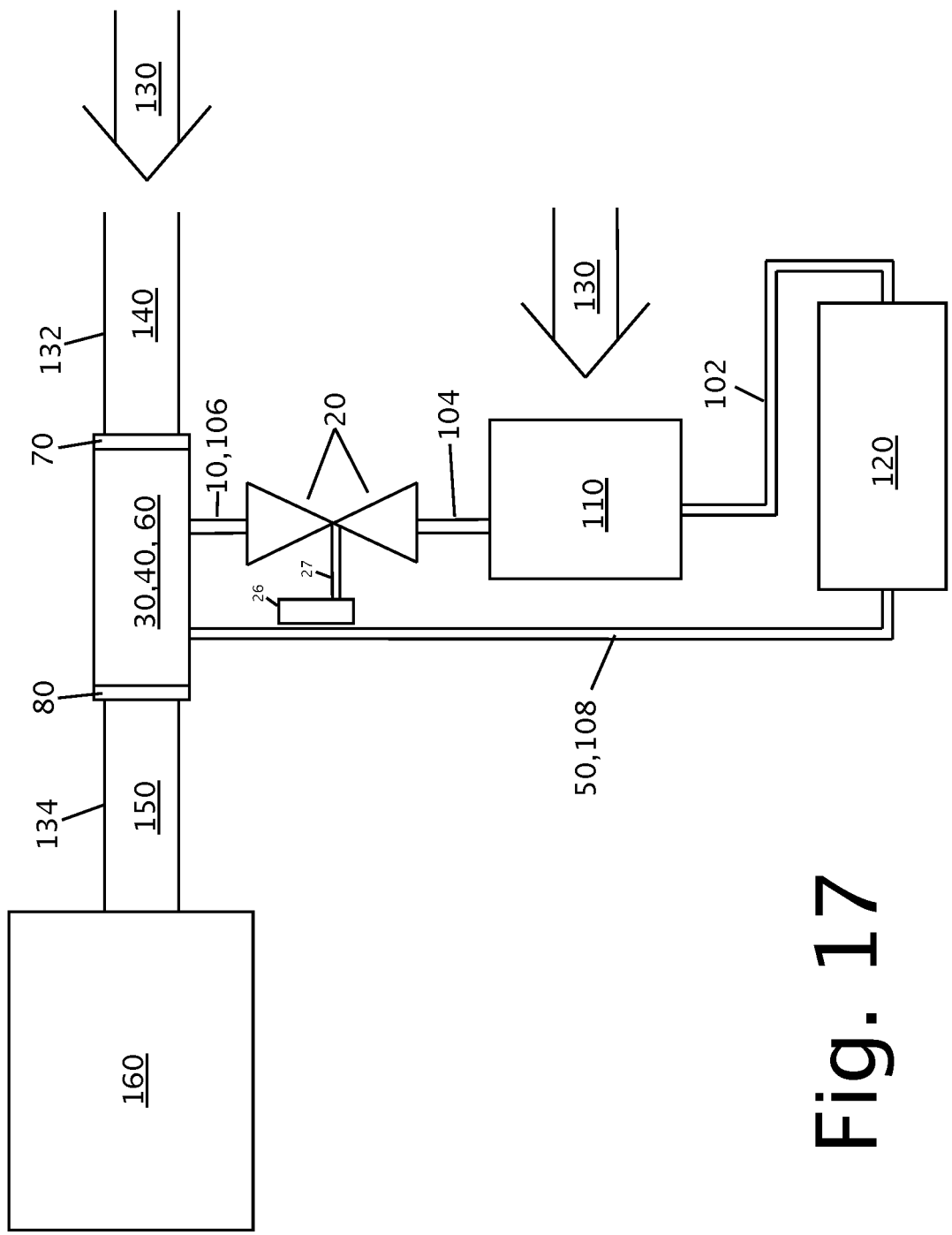
FIG. 17 is a diagram of the whole refrigeration cycle depicting the first embodiment of refrigeration cycle intercooler with dual coil evaporator within the whole refrigeration cycle.
Figure 18:
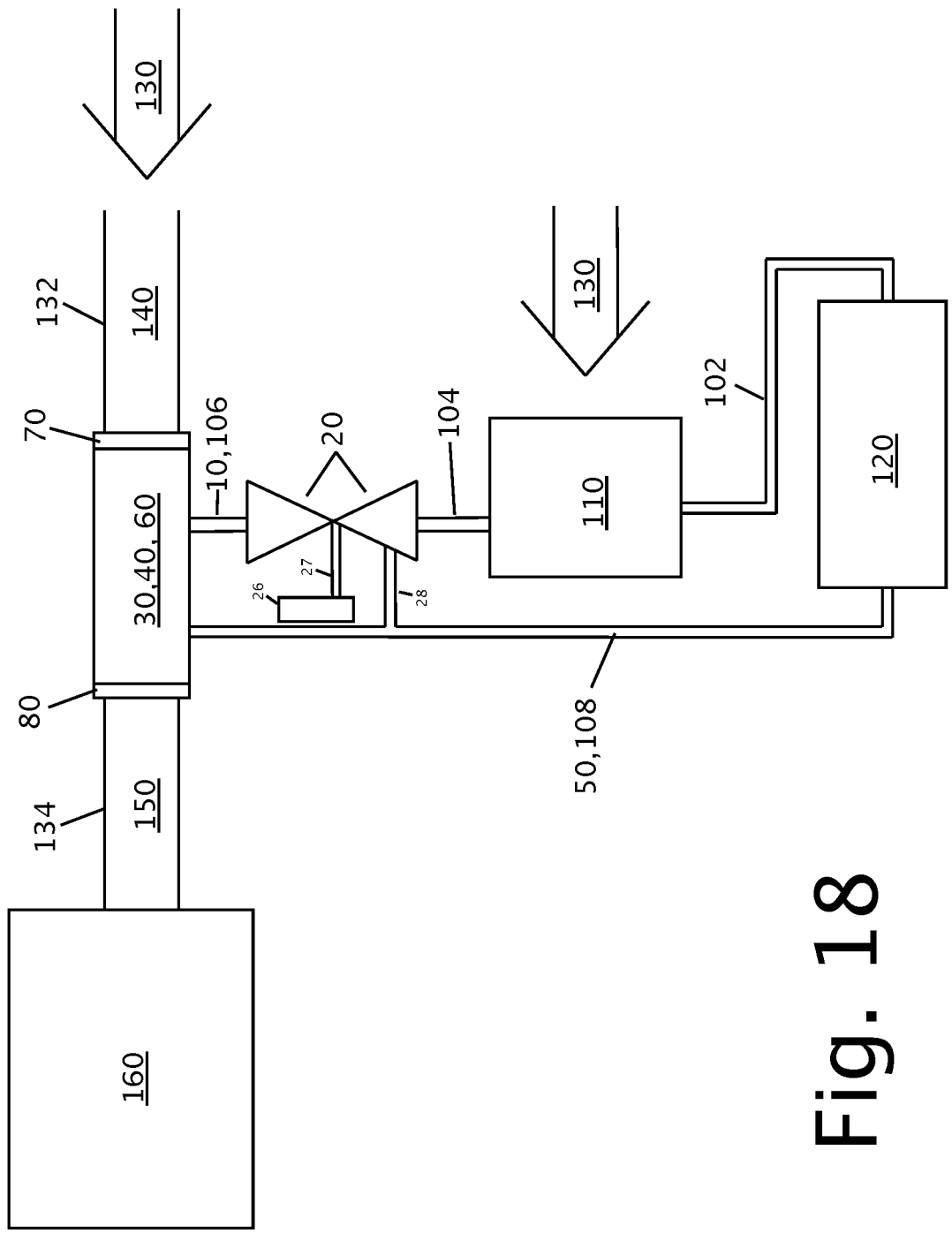
FIG. 18 is a diagram of the whole refrigeration cycle depicting the second embodiment of refrigeration cycle intercooler with dual coil evaporator within the whole refrigeration cycle.

| Term | Definition |
|---|---|
| 5 | Refrigeration Cycle Intercooler with Dual Coil Evaporator |
| 10 | Main Refrigerant Feed Line |
| 20 | Thermal Expansion Valve |
| 26 | Temperature Sensing Bulb |
| 27 | Temperature Sensing Bulb Tube |
| 28 | External Equalization Tube |
| 30 | Inner Coil Evaporator |
| 32 | Inner Coil Input Tube |
| 40 | Outer Coil Evaporator |
| 42 | Outer Coil Input Tube |
| 50 | Main Refrigerant Return Line |
| 60 | Cylindrical Housing |
| 70 | First Clamp |
| 80 | Second Clamp |
| 92 | Electronic Expansion Valve |
| 93 | Electrical Wire |
| 94 | Capillary Tube |
| 96 | Fixed Orifice |
| 102 | High Pressure Gaseous Refrigerant |
| 104 | High Pressure Liquid Refrigerant |
| 106 | Low Pressure Liquid Refrigerant |
| 108 | Low Pressure Gaseous Refrigerant |
| 110 | Condenser |
| 120 | Compressor |
| 130 | Fresh Air or Outside Air |
| 132 | Fresh Air Conduit Exiting from the Air Cleaner |
| 134 | Fresh Air Conduit Entering into the Intake Manifold |
| 140 | Non-Cooled Intake Air for Engine or Motor |
| 150 | Cooled and Dried Intake Air for Engine or Motor |
| 160 | Internal Combustion Engine or Motor |

DETAILED DESCRIPTION OF THE INVENTION

Refrigeration cycle intercooler with dual coil evaporator 5 is a component in a refrigeration cycle where the refrigeration cycle comprises: a thermal expansion valve 20, an inner coil evaporator 30, an outer coil evaporator 40, a condenser 110, and a compressor 120. The refrigeration cycle operates by continuously cycling a refrigerant through a closed loop where liquid refrigerant passes through the thermal expansion valve 20 and then simultaneously passes through the inner coil evaporator 30 and the outer coil evaporator 40 where the refrigerant changes from liquid to gas in the inner coil evaporator 30 and the outer coil evaporator 40, thereby providing a cooling effect at the inner coil evaporator 30 and the outer coil evaporator 40. Then the gaseous refrigerant passes through a compressor 120 which increases the pressure of the gaseous refrigerant and forces it through the condenser 110 where the refrigerant changes from a gas to a liquid, thereby providing a heating effect at the condenser 110. Then the liquid refrigerant is forced into the thermal expansion valve 20 in order to start the whole cycle over again. The net result of the refrigeration cycle is cooling at the inner and outer coil evaporators 30,40 and heating at the condenser 110. During operation, fresh air or outside air 130 continuously passes by the inner and outer coil evaporators 30,40 to continuously cool and dry the fresh air or outside air 130 passing through the inner and outer coil evaporators 30,40. During operation, fresh air or outside air 130 continuously passes through the condenser 110 to continuously heat the fresh air or outside air 130 passing through the condenser 110. A large degree of thermodynamic efficiency is gained from the phase changes of the refrigerant in a refrigeration cycle that is considerably more than that of a standard intercooler which does not use a refrigeration cycle for its cooling. The entire refrigeration cycle of this invention is contained within a car, truck, or vehicle with an internal combustion engine or motor 160. Refrigeration cycle intercooler with dual coil evaporator 5 is a component of this refrigeration cycle and is essentially the inner coil evaporator 30 and the outer coil evaporator 40 components of the refrigeration cycle. The inner coil evaporator 30 and the outer coil evaporator 40 function to cool and dry the intake air 140 for the internal combustion engine or motor 160. As depicted in FIGS. 17-21, fresh air or outside air 130 is channeled through the inner coil evaporator 30 and the outer coil evaporator 40 thereby turning non-cooled intake air 140 into cooled and dried intake air 150 as it passes through the inner and outer coil evaporators 30,40. The cooled and dried intake air 150 is then fed into the internal combustion engine or motor 160. The power output and efficiency of an internal combustion engine or motor 160 is greatly increased by cooling and drying the intake air prior to the internal combustion process. All intercoolers perform this cooling and drying of intake air into an internal combustion engine.

Refrigeration cycle intercooler with dual coil evaporator 5 comprises: a main refrigerant feed line 10; a thermal expansion valve 20; an inner coil evaporator 30; an outer coil evaporator 40; a main refrigerant return line 50; and a cylindrical housing 60.

Thermal expansion valve 20 is a valve that controls or meters the amount of low pressure liquid refrigerant 106 released into the inner and outer coil evaporators 30, 40. A thermal expansion valve 20 is sometimes referred to as a metering valve or a throttle valve. A thermal expansion valve 20 is a basic component of a refrigeration cycle. Thermal expansion valve 20 has a valve, an entry port, an exit port, and a temperature sensing bulb 26. The temperature sensing bulb 26 is an isolated chamber filled with refrigerant which expands and contracts according to temperature and is linked to a mechanical valve in the thermal expansion valve 20. The temperature sensing bulb 26 is positioned adjacent to the main refrigerant return line 50 as depicted which allows the temperature sensing bulb 26 to measure the temperature or mimic the temperature of the main refrigerant return line 50. The temperature sensing bulb 26 is connected to the mechanical valve with a temperature sensing bulb tube 27. Temperature sensing bulb tube 27 is a length of conduit, pipe, or tubing with a first end connected to thermal expansion valve 20 and a second end connected to temperature sensing bulb 26 to form an air tight and liquid tight connection between these members. The expansion and contraction of the refrigerant in the temperature sensing bulb 26 causes the mechanical valve to open as the temperature in the temperature sensing bulb 26 increases and to close as the temperature in the temperature sensing bulb 26 decreases, thereby metering refrigerant flow into the inner and outer coil evaporators 30, 40. Influent refrigerant to the thermal expansion valve 20 is under high pressure and in the liquid state and is designated as high pressure liquid refrigerant 104. Effluent refrigerant from the thermal expansion valve 20 is under low pressure and in the liquid state and is designated as low pressure liquid refrigerant 106. Thermal expansion valve 20 may be any known type of expansion valve including an internally equalized valve, as depicted in FIGS. 1-8 and 17 or an externally equalized valve as depicted in FIGS. 9-18 and 18. Thermal expansion valve 20 may optionally include an external equalization tube 28. External equalization tube 28 is a length of conduit, pipe, or tubing with a first end connected to the thermal expansion valve 20 and a second end connected to the main refrigerant return line 50 to form an air tight and liquid tight connection between these members. External equalization tube 28 functions to equalize the pressure of the refrigerant in the influent side of the thermal expansion valve 20 with the pressure of the refrigerant in the main refrigerant return line 50. Thermal expansion valve 20 must be calibrated to yield the desired flow rate of refrigerant into the inner and outer coil evaporators 30, 40. The exit port of thermal expansion valve 20 is connected the main refrigerant feed line 10 to form an air tight and liquid tight connection between these members.

Main refrigerant feed line 10 is a length of conduit, pipe, or tubing that functions to transport low pressure liquid refrigerant 106 from thermal expansion valve 20 to the first ends of inner and outer coil input tubes 32,42. Main refrigerant feed line 10 has a first end and a second end. The first end of main refrigerant feed line 10 is connected to the exit port on thermal expansion valve 20 to form an air tight and liquid tight connection between these members. The second end of main refrigerant feed line 10 is connected to the first ends of inner coil input tubes 32 and to the first ends of outer coil input tube 42 to form an air tight and liquid tight connection between these members.

All conduits, pipes, or tubing in this invention must be sturdy and capable of containing refrigerant under very high pressures and temperatures. All connections between conduits, pipes, or tubing in this invention must also be sturdy and capable of containing refrigerant under very high pressures and temperatures. All connections between conduits, pipes, or tubing in this invention may be accomplished by any known means such as: solder connection, weld connection, threaded connection, compression connection, glued connection, or similar. In best mode, all connections between conduits, pipes, or tubing are accomplished by a solder connection.

An evaporator is a device that boils or evaporates liquid into a gas or vapor by adding heat to the liquid to cause it to evaporate into a gas or vapor. An evaporator is a basic component of a refrigeration cycle. An evaporator is a containment vessel with an entry port and an exit port. In a refrigeration cycle, primarily liquid refrigerant cooled by a condenser flows through a metering valve where refrigerant pressure is reduced from passing through metering valve thereby lowering the boiling point of the refrigerant. Then the refrigerant flows into the evaporator where the refrigerant is boiled into vapor or gas. Primarily gaseous refrigerant then flows out of the evaporator. An evaporator has a heat exchanger, radiator, or coil. Heat is transmitted to the refrigerant from the heat exchanger, radiator, or coil where air passes through the heat exchanger, radiator, or coil to import heat into the refrigerant. The cooled air is then used for cooling purposes such as cooling the air inside of a refrigerator. In the case of this invention, the cooled air is used by the internal combustion engine where it is used as cooled and dried intake air 150 for an internal combustion engine or motor 160. In the case of this invention, the evaporator is an assembly of an inner coil evaporator 30 and an outer coil evaporator 40.

Inner coil evaporator 30 is a length of conduit, pipe, or tubing that is shaped into a coil shape or helical shape. The conduit, pipe, or tubing has a nominal size of about is about 0.125 to 2.0 inches in diameter. Inner coil evaporator 30 has: an inside diameter, an outside diameter, a length, a first end, and a second end. The outside diameter of inner coil evaporator 30 is sized to make a slip fit or a press fit with the inside diameter of outer coil evaporator 40 so that the inner coil evaporator 30 may fit neatly and tightly within outer coil evaporator 40 as depicted. The length of inner coil evaporator 30 is about 5 to 30 inches. The coil shape or helical shape of inner coil evaporator 30 has a number of windings in the coil shape or helical shape. The number of windings in the coil shape or helical shape of inner coil evaporator 30 is about 5 to 50 windings. Inner coil evaporator 30 may be made of any known material such as metal. In best mode, inner coil evaporator 30 is made of copper.

Inner coil evaporator 30 further comprises one or more inner coil input tubes 32. Each inner coil input tube 32 is a length of conduit, pipe, or tubing with a first end and a second end. In best mode, there is one inner coil input tube 32 as depicted. The first end of each inner coil input tube 32 is connected to the second end of main refrigerant feed line 10 to form an air tight and liquid tight connection between these members. The second end of each inner coil input tube 32 is connected to the first end of inner coil evaporator 30 to form an air tight and liquid tight connection between these members. Each inner coil input tube 32 functions to connect the main refrigerant feed line 10 to the inner coil evaporator 30 so that refrigerant may pass from the main refrigerant feed line 10 to the inner coil evaporator 30. Each inner coil input tube 32 has an inner diameter that is equal to or less than that of inner coil evaporator 30. Inner coil input tube 32 may be made of any known material such as metal. In best mode, inner coil input tube 32 is made of copper.

Outer coil evaporator 40 is a length of conduit, pipe, or tubing that is shaped into a coil shape or helical shape. The conduit, pipe, or tubing has a nominal size of about is about 0.125 to 2.0 inches in diameter. Outer coil evaporator 40 has: an inside diameter, an outside diameter, a length, a first end, and a second end. The inside diameter of outer coil evaporator 40 is sized to make a slip fit or a press fit with the outside diameter of inner coil evaporator 30 so that the outer coil evaporator 40 may fit neatly and tightly around inner coil evaporator 30 as depicted. The length of outer coil evaporator 40 is about 5 to 30 inches. The coil shape or helical shape of outer coil evaporator 40 has a number of windings in the coil shape or helical shape. The number of windings in the coil shape or helical shape of outer coil evaporator 40 is about 5 to 50 windings. The length of coil shape or helical shape of the outer coil evaporator 40 is essentially equivalent to that of the inner coil evaporator 30. The number of windings of the outer coil evaporator 40 is essentially equivalent to that of the inner coil evaporator 30. Outer coil evaporator 40 may be made of any known material such as metal. In best mode, outer coil evaporator 40 is made of copper.

Outer coil evaporator 40 further comprises one or more outer coil input tubes 42. Each outer coil input tube 42 is a length of conduit, pipe, or tubing with a first end and a second end. In best mode, there are two outer coil input tubes 42 as depicted. Two outer coil input tubes 42 are used to supply more refrigerant to the outer coil evaporator 40 than is supplied to the inner coil evaporator 30 through its one inner coil input tube 32 wherein more cooling is required on the outer coil evaporator 40 than is required for the inner coil evaporator 30 because there is more heat transfer from the cylindrical housing 60 to outer coil evaporator 40 than to the inner coil evaporator 30. The first end of each outer coil input tube 42 is connected to the second end of main refrigerant feed line 10 to form an air tight and liquid tight connection between these members. The second end of each outer coil input tube 42 is connected to the first end of outer coil evaporator 40 to form an air tight and liquid tight connection between these members. Each outer coil input tube 42 functions to connect the main refrigerant feed line 10 to the outer coil evaporator 40 so that refrigerant may pass from the main refrigerant feed line 10 to the outer coil evaporator 40. Each outer coil input tube 42 has an inner diameter that is equal to or less than that of outer coil evaporator 40. Outer coil input tube 42 may be made of any known material such as metal. In best mode, outer coil input tube 42 is made of copper.

Importantly, in best mode, the coil shape or helical shape of inner coil evaporator 30 is wound in the opposite direction of the coil shape or helical shape of outer coil evaporator 40. Thus, if the coil shape or helical shape of inner coil evaporator 30 is wound in a clockwise direction, then the coil shape or helical shape of outer coil evaporator 40 should be wound in the counterclockwise direction and vice versa. This reverse winding of inner and outer coil evaporators 30,40 creates significantly greater cooling and drying of the intake air for the motor or engine than does an arrangement with the same winding direction. In best mode, as depicted, the coil shape or helical shape of inner coil evaporator 30 is wound in a clockwise direction as viewed from the first end of inner coil evaporator 30 and the coil shape or helical shape of outer coil evaporator 40 is wound in a counterclockwise direction as viewed from the first end of outer coil evaporator 40.

Main refrigerant return line 50 is a length of conduit, pipe, or tubing that functions to transport low pressure gaseous refrigerant 108 from the second ends of the inner and outer coil evaporators 30,40 to the compressor 120. Main refrigerant return line 50 has a first end and a second end. The first end of main refrigerant return line 50 is connected to both the second end of inner coil evaporator 30 and the second end of the outer coil evaporator 40 to form an air tight and liquid tight connection between these members. The second end of main refrigerant return line 50 is connected to the entry port of the compressor 120 to form an air tight and liquid tight connection between these members.

Cylindrical housing 60 is a rigid solid cylindrical member with open ends. Cylindrical housing 60 has a first end and a second end. Cylindrical housing 60 has a length, an inner diameter, and an outer diameter. The length of cylindrical housing 60 is slightly longer than those of inner and outer coil evaporators 30,40. The inner diameter of cylindrical housing 60 is slightly larger than the outer diameter of outer coil evaporators 40. Cylindrical housing 60 functions to house or cover the inner and outer coil evaporators 30,40 as depicted. The inner and outer coil evaporators 30,40 are inserted into the cylindrical housing 60 as depicted. This assembly of cylindrical housing 60, inner coil evaporator 30, and outer coil evaporator 40 is positioned within or plumbed into the fresh air intake plumbing system for the internal combustion engine or motor 160 so that all of the air being supplied into the internal combustion engine or motor 160 passes through the cylindrical housing 60 and passes by the inner and outer coil evaporators 30,40, which cools and dries the intake air being supplied to the internal combustion engine or motor 160. This assembly of cylindrical housing 60, inner coil evaporator 30, and outer coil evaporator 40 is located or plumbed in between the air cleaner (not depicted) of the internal combustion engine or motor 160 and the intake manifold (not depicted) of the internal combustion engine or motor 160.

A first clamp 70 and a second clamp 80 are used to install or plumb the assembly of cylindrical housing 60, inner coil evaporator 30, and outer coil evaporator 40 into this location. First clamp 70 is a resilient cylindrical shaped member with open ends. First clamp 70 has a first end, a second end, and a length. The length of first clamp 70 is about 1 to 10 inches long. The first end of first clamp 70 has an inside diameter that is sized to make a slip fit or a press fit with the outside dimeter of the fresh air conduit exiting 132 from the air cleaner of the internal combustion engine or motor 160. The first end of first clamp 70 is attached or clamped onto the fresh air conduit exiting 132 from the air cleaner of the internal combustion engine or motor 160 to form an air tight connection there between. The second end of first clamp 70 has an inside diameter that is sized to make a slip fit or a press fit with the outside diameter of cylindrical housing 60. The second end of first clamp 70 is attached or clamped onto the outside diameter of the first end of cylindrical housing 60 to form an air tight connection there between. First clamp 70 has a clearance hole for the main refrigerant feed line 10 which forms an air tight connection around the main refrigerant feed line 10. The main refrigerant feed line 10 passes through first clamp 70 as depicted. Thermal expansion valve 20 is located outside of first clamp 70 as depicted. First clamp 70 has a clearance hole for the main refrigerant return line 50 which forms an air tight connection around the main refrigerant return line 50. The main refrigerant return line 50 passes through first clamp 70 as depicted. First clamp 70 may be any known type of pipe clamp, hose clamp, conduit clamp, or tubing clamp. Second clamp 80 is a resilient cylindrical shaped member with open ends. Second clamp 80 has a first end, a second end, and a length. The length of second clamp 80 is about 1 to 10 inches long. The first end of second clamp 80 has an inside diameter that is sized to make a slip fit or a press fit with the outside diameter of cylindrical housing 60. The first end of second clamp 80 is attached or clamped onto the outside diameter of the second end of cylindrical housing 60 to form an air tight connection there between. The second end of second clamp 80 has an inside diameter that is sized to make a slip fit or a press fit the outside dimeter of the fresh air conduit 134 entering into the intake manifold of the internal combustion engine or motor 160. The second end of second clamp 80 is attached or clamped onto the fresh air conduit 134 entering into the intake manifold of the internal combustion engine or motor 160 to form an air tight connection there between. Second clamp 80 may be any known type of pipe clamp, hose clamp, conduit clamp, or tubing clamp. First and second clamps 70,80 are not key components of this invention because there are a number of off the shelf clamps that will allow this invention to function properly. Thus, first and second clamps 70,80 are not included in the claim set for this invention.

Compressor 120 is a device that increases the pressure of a gas by reducing its volume. Compressor 120 uses a mechanical mechanism to pump gaseous refrigerant into a smaller volume thereby increasing its pressure. A compressor 1200 is a basic component of a refrigeration cycle. Compressor 120 is a containment vessel with an entry port and an exit port. Gaseous refrigerant from inner and outer coil evaporators 30,40 flows into compressor 120 from its entry port and pressurized gaseous refrigerant flows out of compressor 120 from its exit port. The pressurization of the gaseous refrigerant causes the refrigerant to heat up. Compressor 120 must be capable of containing refrigerant under very high pressures and temperatures. Influent refrigerant [108] to the compressor 120 is under low pressure. Effluent refrigerant [102] from compressor 120 is under high pressure. Compressor 120 may be any known type of evaporator such as a reciprocating compressors, ionic liquid piston compressor, rotary screw compressor, rotary vane compressor, rolling piston compressor, scroll compressor, diaphragm compressor, dynamic compressor, or any other known type of compressor. The exit port of compressor 120 is connected by piping or tubing to the entry port on condenser 110 to form an air tight and liquid tight connection between these members. In best mode, compressor 120 is electrically operated. Thus, in best mode, compressor 120 is a 12-volt compressor that is powered electrically by the vehicle 12 volt battery (not depicted). Optionally, compressor 120 may be mechanical wherein it is mechanically connected to the crankshaft of the internal combustion engine or motor 160 in order to power the compressor 120. In best mode, compressor 120 is a separate device from the standard compressor that operates the air conditioning unit in the vehicle. Compressor 120 must be located on the vehicle somewhere and is typically located under the hood of the vehicle inside of the engine compartment. Compressor 120 is not a key component of this invention because there are a number of off the shelf compressors that will allow this invention to function properly. Thus, a compressor 120 is not included in the claim set for this invention.

Condenser 110 is a device that condenses gas or vapor into a liquid by removing heat from the gas or vapor to cause it to condense into a liquid. A condenser 110 is a basic component of a refrigeration cycle. Condenser 110 is a containment vessel with an entry port and an exit port 14. Primarily gaseous refrigerant flows into condenser 110 from entry port and primarily liquid refrigerant flows out of condenser 110 from the exit port. The containment vessel has a heat exchanger, radiator, or coil. Heat is transmitted to the environment through the heat exchanger, radiator, or coil where fresh air or outside air 130 passes through the heat exchanger, radiator, or coil to remove heat from the refrigerant that is also passing through the heat exchanger, radiator, or coil. The heated air is then released into the environment. Condenser 110 must be capable of containing refrigerant under very high pressures and temperatures. Influent refrigerant [102] to the condenser 110 is gaseous. Effluent refrigerant [104] from condenser 110 is liquid. Condenser 110 may be any known type of condenser. The exit port of condenser 110 is connected by piping or tubing to the entry port on thermal expansion valve 20 to form an air tight and liquid tight connection between these members. Condenser 110 must be located on the vehicle somewhere and is typically located under the hood of the vehicle inside of the engine compartment. Condenser 110 is not a key component of this invention because there are a number of off the shelf condenser that will allow this invention to function properly. Thus, a condenser 110 is not included in the claim set for this invention.

As stated above, thermal expansion valve 20 may be internally equalized valve, as depicted in FIGS. 1-8 and 17 or an externally equalized valve as depicted in FIGS. 9-18 and 18 to make up the first and second embodiments respectively of refrigeration cycle intercooler with dual coil evaporator 5.

Figure 19:
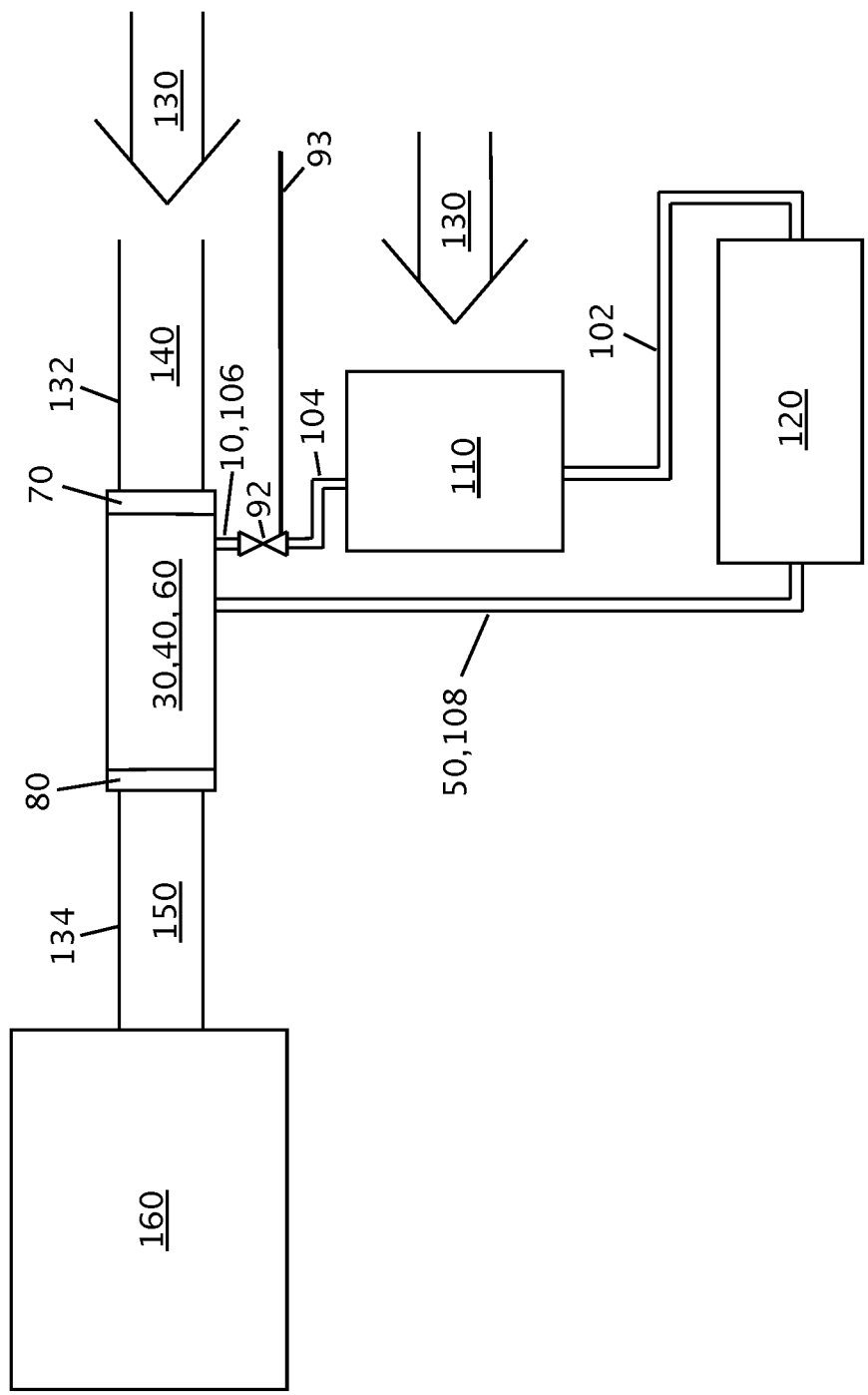
FIG. 19 is a diagram of the whole refrigeration cycle depicting the third embodiment of refrigeration cycle intercooler with dual coil evaporator within the whole refrigeration cycle.

Optionally, a third embodiment exists wherein an electronic expansion valve 92 is used instead of an internally or externally equalized thermal expansion valve 20. With this embodiment, the electronic expansion valve 92 is piped or plumbed into the refrigeration cycle just as thermal expansion valve 20 is. However, the electronic expansion valve 92 controls the flow of refrigerant or throttles the flow of refrigerant by a computer or computer software (not depicted) that is connected to the electronic expansion valve 92 by an electrical wire 93 so that there is electrical continuity between the computer or computer software and the electronic expansion valve 92. With this embodiment, the computer or computer software uses sensors (not depicted) to perform calculations that determine how much refrigerant to allow to pass into the inner and outer coil evaporators 30, 40 and then opens nor closed the electronic expansion valve 92 accordingly. The electronic expansion valve 92 uses an actuator to open and close the valve. Any known type of electronic expansion valve 92 may be used. This embodiment is depicted in FIG. 19.

Figure 20:
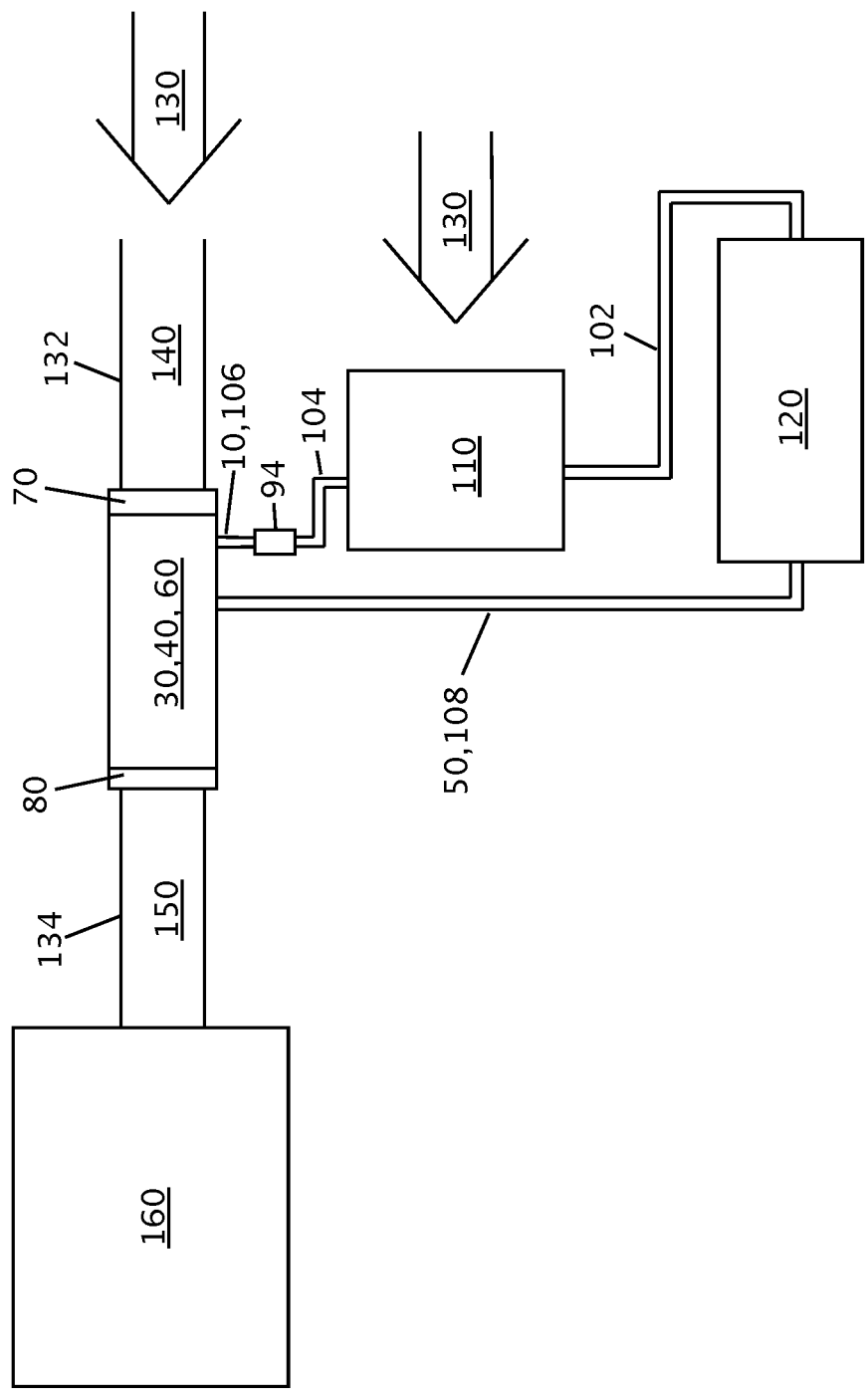
FIG. 20 is a diagram of the whole refrigeration cycle depicting the fourth embodiment of refrigeration cycle intercooler with dual coil evaporator within the whole refrigeration cycle.

Still optionally, a fourth embodiment exists wherein a capillary tube 94 is used instead of an internally or externally equalized thermal expansion valve 20. A capillary tube is a length of very small diameter length of conduit, pipe, or tubing. The inner diameter of capillary tube is about 0.010 to 0.150 inches. This very small inner diameter mechanically limits the flow of refrigerant through the refrigeration system. A capillary tube 94 is a basic component of a refrigeration cycle. With this embodiment, the capillary tube 94 is piped or plumbed into the refrigeration cycle just as thermal expansion valve 20 is. However, the capillary tube 94 controls the flow of refrigerant or throttles the flow of refrigerant manually by allowing a preset amount of refrigerant flow into the inner and outer coil evaporators 30, 40. Any known type of capillary tube 94 that yields the proper flow rate may be used. This embodiment is depicted in FIG. 20.

Figure 21:
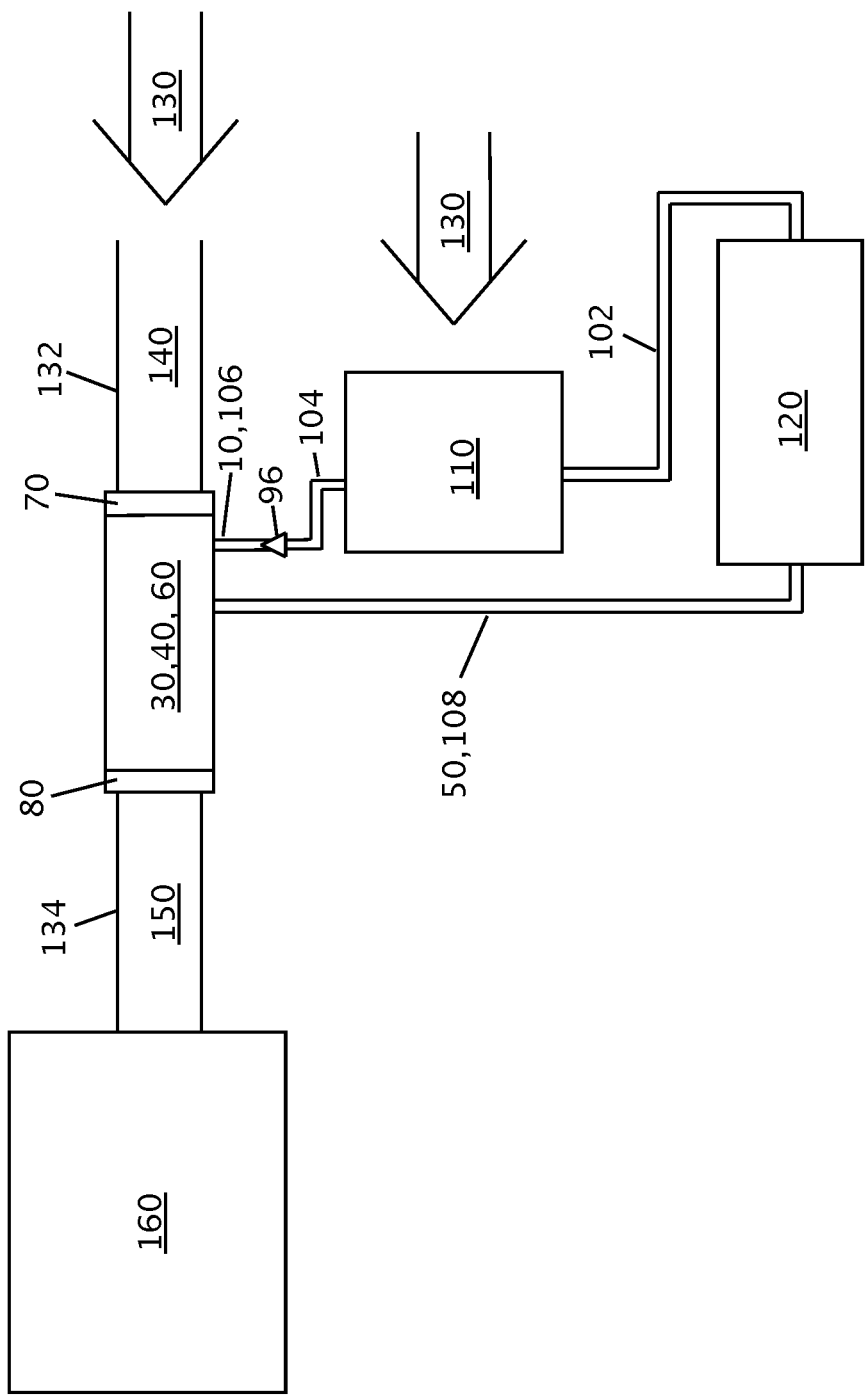
FIG. 21 is a diagram of the whole refrigeration cycle depicting the fifth embodiment of refrigeration cycle intercooler with dual coil evaporator within the whole refrigeration cycle.

Still optionally, a fifth embodiment exists wherein a fixed orifice 96 is used instead of an internally or externally equalized thermal expansion valve 20. A fixed orifice 96 is a pipe or tubing fitting with a with a very small diameter orifice inside. The inner diameter of the orifice is about 0.010 to 0.150 inches. This very small inner diameter mechanically limits the flow of refrigerant through the refrigeration system. A fixed orifice 96 is a basic component of a refrigeration cycle. With this embodiment, the fixed orifice 96 is piped or plumbed into the refrigeration cycle just as thermal expansion valve 20 is. However, the fixed orifice 96 controls the flow of refrigerant or throttles the flow of refrigerant manually by allowing a preset amount of refrigerant flow into the inner and outer coil evaporators 30, 40. Any known type of fixed orifice 96 that yields the proper flow rate may be used. This embodiment is depicted in FIG. 21.

In summary, the refrigeration cycle operates by the compressor 120 pumping high pressure gaseous refrigerant 102 through the condenser 110, where the refrigerant condenses, and emerges as high pressure liquid refrigerant 104, which continues to be pumped by the compressor 120 into the thermal expansion valve 20, or electronic expansion valve 92, or capillary tube 94, or fixed orifice 96, from which the refrigerant emerges as low pressure liquid refrigerant 106, which continues to be pumped by the compressor 120 through the inner and outer coil evaporators 30,40, where the refrigerant boils off into a gas or vapor, and emerges as low pressure gaseous refrigerant 108 to feed into the compressor to start the whole cycle over again. The boiling off of the refrigerant at the inner and outer coil evaporators 30,40 causes a massive cooling effect wherein the fresh air or outside air 130 is directed across the inner and outer coil evaporators 30,40, thereby causing the fresh air or outside air 130 to become substantially cooled and dried intake air 150.

What is claimed is:

1. A refrigeration cycle intercooler with dual coil evaporator comprising: a main refrigerant feed line; a thermal expansion valve; an inner coil evaporator; an outer coil evaporator; a main refrigerant return line; and a cylindrical housing, wherein,
    said thermal expansion valve is a valve that controls or meters the amount a refrigerant released into said main refrigerant line, said thermal expansion valve comprises a valve, an entry port, an exit port, and a temperature sensing bulb, said temperature sensing bulb is an isolated chamber filled with said refrigerant, said main refrigerant feed line is a length of conduit, pipe, or tubing with a first end and a second end, said first end of said main refrigerant feed line is connected to said exit port on said thermal expansion valve, said inner coil evaporator is a length of conduit, pipe, or tubing that is shaped into a coil shape or helical shape, said inner coil evaporator has a first end and a second end, said inner coil evaporator further comprises one or more inner coil input tubes, each with a first end and a second end, said first end of each of said one or more inner coil input tubes is connected to said second end of said main refrigerant feed line, said second end of each of said one or more inner coil input tubes is connected to said first end of said inner coil evaporator, said outer coil evaporator is a length of conduit, pipe, or tubing that is shaped into a coil shape or helical shape, said outer coil evaporator has a first end and a second end, said outer coil evaporator further comprises one or more outer coil input tubes, each with a first end and a second end, said first end of each of said one or more outer coil input tubes is connected to said second end of said main refrigerant feed line, said second end of each of said one or more outer coil input tubes is connected to said first end of said outer coil evaporator, said main refrigerant return line is a length of conduit, pipe, or tubing with a first end and a second end, said first end of said main refrigerant return line is connected to said second end of said inner coil evaporator and to said second end of said outer coil evaporator, said cylindrical housing is a rigid solid cylindrical member with open ends, said cylindrical housing has a first end and a second end, and said cylindrical housing is positioned over said inner and outer coil evaporators to house or cover said inner and outer coil evaporators so that said first end of said cylindrical housing is adjacent to those of said inner and outer coil evaporators and said second end of said cylindrical housing is adjacent to those of said inner and outer coil evaporators.

2. A refrigeration cycle intercooler with dual coil evaporator as recited in claim 1, wherein, said thermal expansion valve further comprises an external equalization tube, wherein, said external equalization tube is a length of conduit, pipe, or tubing with a first end and a second end, said first end of said external equalization tube is connected to said thermal expansion valve, and said second end of said external equalization tube is connected to said main refrigerant return line.

3. A refrigeration cycle intercooler with dual coil evaporator comprising: a main refrigerant feed line; an electronic expansion valve; an inner coil evaporator; an outer coil evaporator; a main refrigerant return line; and a cylindrical housing, wherein, said electronic expansion valve is a valve that controls or meters the amount a refrigerant released into said main refrigerant line, said electronic expansion valve comprises a valve, an entry port, an exit port, and an electrical wire, said main refrigerant feed line is a length of conduit, pipe, or tubing with a first end and a second end, said first end of said main refrigerant feed line is connected to said exit port on said electronic expansion valve, said inner coil evaporator is a length of conduit, pipe, or tubing that is shaped into a coil shape or helical shape, said inner coil evaporator has a first end and a second end, said inner coil evaporator further comprises one or more inner coil input tubes, each with a first end and a second end, said first end of each of said one or more inner coil input tubes is connected to said second end of said main refrigerant feed line, said second end of each of said one or more inner coil input tubes is connected to said first end of said inner coil evaporator, said outer coil evaporator is a length of conduit, pipe, or tubing that is shaped into a coil shape or helical shape, said outer coil evaporator has a first end and a second end, said outer coil evaporator further comprises one or more outer coil input tubes, each with a first end and a second end, said first end of each of said one or more outer coil input tubes is connected to said second end of said main refrigerant feed line, said second end of each of said one or more outer coil input tubes is connected to said first end of said outer coil evaporator, said main refrigerant return line is a length of conduit, pipe, or tubing with a first end and a second end, said first end of said main refrigerant return line is connected to said second end of said inner coil evaporator and to said second end of said outer coil evaporator, said cylindrical housing is a rigid solid cylindrical member with open ends, said cylindrical housing has a first end and a second end, and said cylindrical housing is positioned over said inner and outer coil evaporators to house or cover said inner and outer coil evaporators so that said first end of said cylindrical housing is adjacent to those of said inner and outer coil evaporators and said second end of said cylindrical housing is adjacent to those of said inner and outer coil evaporators.

4. A refrigeration cycle intercooler with dual coil evaporator comprising: a main refrigerant feed line; a capillary tube; an inner coil evaporator; an outer coil evaporator; a main refrigerant return line; and a cylindrical housing, wherein, said capillary tube is a length of small diameter conduit, pipe, or tubing that controls or meters the amount a refrigerant released into said main refrigerant line, said capillary tube has a first end and a second end, said main refrigerant feed line is a length of conduit, pipe, or tubing with a first end and a second end, said first end of said main refrigerant feed line is connected to said second end of said capillary tube, said inner coil evaporator is a length of conduit, pipe, or tubing that is shaped into a coil shape or helical shape, said inner coil evaporator has a first end and a second end, said inner coil evaporator further comprises one or more inner coil input tubes, each with a first end and a second end, said first end of each of said one or more inner coil input tubes is connected to said second end of said main refrigerant feed line, said second end of each of said one or more inner coil input tubes is connected to said first end of said inner coil evaporator, said outer coil evaporator is a length of conduit, pipe, or tubing that is shaped into a coil shape or helical shape, said outer coil evaporator has a first end and a second end, said outer coil evaporator further comprises one or more outer coil input tubes, each with a first end and a second end, said first end of each of said one or more outer coil input tubes is connected to said second end of said main refrigerant feed line, said second end of each of said one or more outer coil input tubes is connected to said first end of said outer coil evaporator, said main refrigerant return line is a length of conduit, pipe, or tubing with a first end and a second end, said first end of said main refrigerant return line is connected to said second end of said inner coil evaporator and to said second end of said outer coil evaporator, said cylindrical housing is a rigid solid cylindrical member with open ends, said cylindrical housing has a first end and a second end, and said cylindrical housing is positioned over said inner and outer coil evaporators to house or cover said inner and outer coil evaporators so that said first end of said cylindrical housing is adjacent to those of said inner and outer coil evaporators and said second end of said cylindrical housing is adjacent to those of said inner and outer coil evaporators.

5. A refrigeration cycle intercooler with dual coil evaporator comprising: a main refrigerant feed line; a fixed orifice; an inner coil evaporator; an outer coil evaporator; a main refrigerant return line; and a cylindrical housing, wherein, said fixed orifice is a pipe or tubing fitting with a with a very small diameter orifice inside that controls or meters the amount a refrigerant released into said main refrigerant line, said fixed orifice has a first end and a second end, said main refrigerant feed line is a length of conduit, pipe, or tubing with a first end and a second end, said first end of said main refrigerant feed line is connected to said second end of said capillary tube, said inner coil evaporator is a length of conduit, pipe, or tubing that is shaped into a coil shape or helical shape, said inner coil evaporator has a first end and a second end, said inner coil evaporator further comprises one or more inner coil input tubes, each with a first end and a second end, said first end of each of said one or more inner coil input tubes is connected to said second end of said main refrigerant feed line, said second end of each of said one or more inner coil input tubes is connected to said first end of said inner coil evaporator, said outer coil evaporator is a length of conduit, pipe, or tubing that is shaped into a coil shape or helical shape, said outer coil evaporator has a first end and a second end, said outer coil evaporator further comprises one or more outer coil input tubes, each with a first end and a second end, said first end of each of said one or more outer coil input tubes is connected to said second end of said main refrigerant feed line, said second end of each of said one or more outer coil input tubes is connected to said first end of said outer coil evaporator, said main refrigerant return line is a length of conduit, pipe, or tubing with a first end and a second end, said first end of said main refrigerant return line is connected to said second end of said inner coil evaporator and to said second end of said outer coil evaporator, said cylindrical housing is a rigid solid cylindrical member with open ends, said cylindrical housing has a first end and a second end, and said cylindrical housing is positioned over said inner and outer coil evaporators to house or cover said inner and outer coil evaporators so that said first end of said cylindrical housing is adjacent to those of said inner and outer coil evaporators and said second end of said cylindrical housing is adjacent to those of said inner and outer coil evaporators.

* * * * *